United States Patent
Kuratli

(10) Patent No.: US 8,482,386 B2
(45) Date of Patent: Jul. 9, 2013

(54) ACTIVE TRANSPONDER WITH VERY LOW ELECTRIC POWER CONSUMPTION IN STANDBY MODE

(75) Inventor: Christoph Kuratli, Bern (CH)

(73) Assignee: EM Microelectronic-Marin S.A., Marin (CH)

( * ) Notice: Subject to any disclaimer, the term of this patent is extended or adjusted under 35 U.S.C. 154(b) by 475 days.

(21) Appl. No.: 12/730,515

(22) Filed: Mar. 24, 2010

(65) Prior Publication Data

US 2010/0245153 A1  Sep. 30, 2010

(30) Foreign Application Priority Data

Mar. 26, 2009  (EP) .................................... 09156328

(51) Int. Cl.
*H04Q 5/22* (2006.01)
*G05B 19/00* (2006.01)
*G06F 7/00* (2006.01)
*H04B 1/00* (2006.01)

(52) U.S. Cl.
USPC ..... 340/10.1; 340/10.5; 340/572.1; 340/5.61; 340/7.34; 235/382

(58) Field of Classification Search
USPC ..... 340/10.1–10.5, 572.1, 5.61, 7.34; 342/42; 235/382; 455/343.1, 343.3, 550.1, 574
See application file for complete search history.

(56) References Cited

U.S. PATENT DOCUMENTS

| | | | | |
|---|---|---|---|---|
| 5,525,994 A * | 6/1996 | Hurta et al. | ...................... | 342/51 |
| 5,606,313 A * | 2/1997 | Allen et al. | ................ | 340/10.31 |
| 5,606,739 A * | 2/1997 | Goto | .......................... | 455/343.3 |
| 6,593,845 B1 | 7/2003 | Friedman et al. | | |
| 6,683,925 B1 * | 1/2004 | Katsura et al. | ................ | 375/345 |
| 6,750,770 B2 * | 6/2004 | Spiess et al. | ............... | 340/572.3 |
| 6,982,627 B2 * | 1/2006 | Oberhuber et al. | .......... | 340/10.1 |
| 7,876,225 B2 * | 1/2011 | Mickle et al. | .............. | 340/572.4 |
| 7,899,435 B2 * | 3/2011 | Yano | .......................... | 455/343.3 |
| 7,912,443 B2 * | 3/2011 | Rotzoll | ...................... | 455/343.2 |
| 8,019,316 B2 * | 9/2011 | Huston et al. | .............. | 455/343.1 |
| 2001/0010491 A1 * | 8/2001 | Marneweck et al. | ...... | 340/10.33 |
| 2007/0285214 A1 | 12/2007 | Rotzoll | | |
| 2009/0156245 A1 | 6/2009 | Yano | | |
| 2009/0275302 A1 | 11/2009 | Huston et al. | | |

FOREIGN PATENT DOCUMENTS

WO    2007/032317 A1    3/2007

OTHER PUBLICATIONS

European Search Report issued in corresponding application No. EP 09 15 6328 completed Aug. 18, 2009.
"Band-pass filter," at http://www.thefreedictionary.com/p/band-pass%20filter (2012).
"High-pass filter," at http://www.thefreedictionary.com/p/high-pass%20filter (2012).
Low-pass filter, at http://www.thefreedictionary.com/p/low-pass%20filter (2012).
"Transponder," at http://www.tech-faq.com/transponder.html (2012).

* cited by examiner

*Primary Examiner* — Nam V Nguyen
(74) *Attorney, Agent, or Firm* — Griffin & Szipl, P.C.

(57) ABSTRACT

The active transponder includes an input amplifier (26) arranged between an envelope detector (8) and a demodulation circuit (28). It further includes an activation unit (30) for the input amplifier and also for the demodulation circuit, which is formed by a frequency changer or mixer circuit (32), which decreases a significant modulation frequency of the modulated signal received by the antenna to a low frequency, the resulting low frequency signal then being amplified and filtered by low frequency elements. The activation unit thus consumes little electric power and sends a wake up signal to the elements operating at a high frequency when it detects said significant modulation frequency, in a very selective manner.

6 Claims, 2 Drawing Sheets

ACTIVE TRANSPONDER WITH VERY LOW ELECTRIC POWER CONSUMPTION IN STANDBY MODE

This application claims priority from European Patent Application No. 09156328.8 filed Mar. 26, 2009, the entire disclosure of which is incorporated herein by reference.

FIELD OF THE INVENTION

The invention concerns an active transponder that includes a logic circuit and an RF input-output circuit provided with an input amplifier. In particular, the invention concerns a transponder of this type arranged such that, in standby mode, only part of the transponder circuits and/or elements are active. The transponder thus includes means for activating the circuits and/or elements that are not active in standby mode, upon reception of an interrogation signal from a reader.

BACKGROUND OF THE INVENTION

FIG. 1 shows a system of the prior art fitted with transponders of the aforecited type. This system includes a reader, fitted with an RF (radio-frequency) communication antenna 3 and then includes at least one transponder 4 that is also fitted with an RF communication antenna 5. Transponder 4 includes an envelope detector 8 for modulated signals received by antenna 5, an analogue RF input-output circuit 10 and a logic part (not shown in FIG. 1). The RF analogue front part 10 essentially defines two branches or paths 12 and 14 between the antenna and the logic part of the transponder. Input path 12 passes through an input amplifier 16 and then a demodulation unit 18, which supplies a logic signal to the logic part of the transponder. Path 14 between the logic part and the antenna forms the transponder response means. This path 14 thus passes through a modulation unit 20 and then through an output amplifier 22.

Transponder 4 is fitted with wake up means that are associated with input amplifier 16. At least this input amplifier is continually active and thus participates in standby mode. When it receives a signal of higher amplitude than a predetermined reference value, the input amplifier activates the top levels and/or parts of the transponder that are inactive in standby mode.

In general, communications systems of the type described in FIG. 1 communicate at a relatively high frequency, the frequency ranges used in active transponder systems being higher and higher in the frequency range, particularly in the megahertz and gigahertz domain. Thus, input amplifier 16 is a high frequency amplifier, which generally has a relatively broad bandwidth due to the fact that it operates at a high frequency.

The arrangement of wake up means in active transponder 4 is used to reduce its electrical power consumption so as to increase its longevity. Thus, the part of the transponder that has to be continually active is limited, to ensure that the transponder is activated upon reception of an interrogation signal from a reader. In the case of the prior art, at least high frequency input amplifier 16 constitutes the continuously powered part.

The system of the prior art described above has various drawbacks, related to the electric power consumption of transponder 4 when the latter is in standby mode. We can identify at least two causes of an increase in the electric power consumption of the transponder in standby mode. Firstly, a high frequency input amplifier has relatively large electric power consumption and, secondly, these high frequency amplifiers generally have quite a broad bandwidth, so that they are capable of amplifying interference signals received by the transponder antenna at frequencies close to those provided for the system concerned. Systems available on the market generally operate within given frequency bands. Thus, different systems may operate at a high frequency in a same, relatively small frequency band in relative value. Input amplifier 16 reacts to the signals received within its bandwidth, which thus includes frequencies belonging to other systems. As a result, interference signals can frequently waken the transponder. This obviously increases the electric power consumption of the transponder, which is woken inadvertently but returns to standby mode again when it has detected that the received signal was not intended for it.

SUMMARY OF THE INVENTION

It is an object of the invention to solve the aforementioned problems in the prior art systems by providing an active transponder that has very low electric power consumption in standby mode and is less likely to be woken by interference signals with frequencies close to the actual frequency provided for the transponder in question.

The active transponder according to the invention therefore includes a logic circuit and an RF input-output circuit, wherein this input-output circuit is formed by an input amplifier arranged between an envelope detector for the signal received by a transponder antenna and a circuit for demodulating the received signal that also forms the input-output circuit. This transponder includes a unit for activating the input amplifier, and this activation unit is formed of a frequency changer circuit or mixer circuit, which receives as input an envelope signal of the antenna signal and a clock signal generated by an internal clock at a clock frequency that is different from, but close to, a modulation frequency of an interrogation signal of an RF system for which the transponder is intended. When the active transponder receives the interrogation signal as input, the frequency changer or mixer circuit supplies as output a low frequency signal, whose value is approximately equal to the difference between the modulation frequency and the clock frequency. The activation unit also includes a low pass filter and low frequency amplifying means for amplifying the low frequency signal, and the activation unit supplies a wake up signal to the input amplifier when this activation unit receives an envelope signal having the modulation frequency and a sufficiently high amplitude.

Owing to the features of the active transponder according to the invention, the high frequency input amplifier is deactivated in standby mode and the input amplifier is activated by an activation unit, which supplies it with a wake up signal when it detects a signal as input that has a significant modulation frequency corresponding to a predetermined modulation frequency for the system concerned. Unlike the input amplifier, this activation unit is arranged to work at a low frequency. Indeed, the function of the frequency changer circuit or mixer circuit and the internal clock is to greatly reduce the significant interrogation signal frequency belonging to the low frequency system, such that the amplifying means provided in the activation unit are low frequency amplifying means, which consume relatively little power. Thus, in a transponder that can operate at a very high frequency, the part of the transponder that remains active in standby mode is arranged to operate at low frequency and therefore consume less power than a high frequency input amplifier associated with means for waking the transponder.

According to a particular embodiment of the invention, the low pass filter and the low frequency amplifying means of the activation unit are provided with a narrow bandwidth so that only signals modulated approximately at the modulation frequency are amplified and generate a wake up signal for the transponder.

Owing to these additional features, combined with the aforementioned features of the activation unit, it is possible to filter the incoming signals very selectively, so that only an interrogation signal modulated at the determined modulation frequency can generate a transponder activation signal. Thus, interference signals with a different frequency from the natural frequency of the system considered, but relatively close thereto, and within the same high frequency range as the natural frequency, can easily be removed by the low pass filter, which allows a high degree of selectivity in absolute value, unlike an input amplifier that operates at a high frequency.

In view of the above, and in accordance with a first non-limiting illustrative embodiment of the present invention, an active transponder is provided that includes a logic circuit and an RF input-output circuit, wherein the RF input-output circuit is formed by an input amplifier arranged between an envelope detector for the signal received by an antenna of the transponder and a demodulation circuit for the signal that also forms the RF input-output circuit, wherein the transponder further includes an activation unit for the input amplifier, which is formed of a frequency changer or mixer circuit, which receives as input an envelope signal of the antenna signal and a clock signal generated by an internal clock at a clock frequency that is different from, but close to, a modulation frequency of an interrogation signal of an RF system for which the transponder is intended, and which supplies as output, when it receives the interrogation signal as input, a low frequency signal, whose value is approximately equal to the difference between the modulation frequency and the clock frequency, and the activation unit also includes a low pass filter and low frequency amplifying means for amplifying the low frequency signal, and the activation unit supplies a wake up signal to the input amplifier when it receives an envelope signal having the modulation frequency and a sufficiently large amplitude. In accordance with a second non-limiting illustrative embodiment of the present invention, the second non-limiting embodiment is modified so that the low pass filter and the low frequency amplifying means are provided with a narrow bandwidth such that only signals modulated approximately at the modulation frequency are amplified and generate a wake up signal.

In accordance with a third non-limiting illustrative embodiment of the present invention, the first non-limiting embodiment is modified so that downstream of the low pass filter and the low frequency amplifying means, it includes a comparator that supplies a logic detection signal as output. In accordance with a fourth non-limiting illustrative embodiment of the present invention, the first non-limiting embodiment is modified so that the input part of the activation unit includes AC coupling means for removing any DC component from the envelope signal. In accordance with a fifth non-limiting illustrative embodiment of the present invention, the first non-limiting embodiment is modified so that the output part of the activation unit includes a flip-flop, which receives the logic detection signal as input. In accordance with a sixth non-limiting illustrative embodiment of the present invention, the first non-limiting embodiment is modified so that the frequency changer or mixer circuit is a passive circuit formed of switches controlled by a pulse generator connected to the internal clock. In accordance with a seventh non-limiting illustrative embodiment of the invention, the first non-limiting embodiment is modified so that the wake up signal is also supplied to the demodulation circuit so as to activate the circuit simultaneously with the input amplifier.

BRIEF DESCRIPTION OF THE DRAWINGS

Other features and advantages of the active transponder according to the present invention will also appear from the detailed description of a preferred embodiment of the invention, given by way of non-limiting example, with reference to the annexed drawings, in which.

DETAILED DESCRIPTION OF THE PREFERRED EMBODIMENTS

Figure 2:
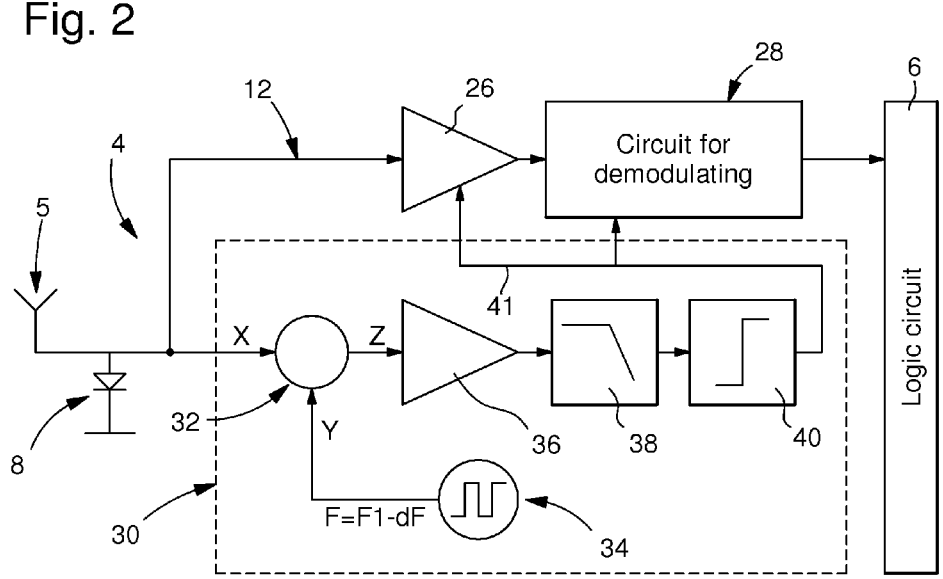
FIG. 2 shows part of a the electronic circuit of an active transponder according to a preferred embodiment of the invention.

FIG. 2 shows a preferred embodiment of an active transponder according to the present invention. FIG. 2 shows only those active transponder circuits that are necessary for comprehension of the present invention. The active transponder includes a logic circuit 6 and an RF input-output circuit 4. The input-output circuit is formed by an input amplifier 26, arranged between an envelope detector 8 of the signal received by an antenna 5 and by a unit for demodulating the incoming signal, which supplies a logic signal to logic circuit 6. In this preferred variant, the input amplifier and also the demodulation circuit each have an input at which an activation signal can be supplied for activating or deactivating input amplifier 26 and, respectively demodulation circuit 28. Within the present invention, this activation signal or wake up signal is applied to the input amplifier and to circuit 28 by an activation unit 30, whose power consumption is minimised.

Figure 3:
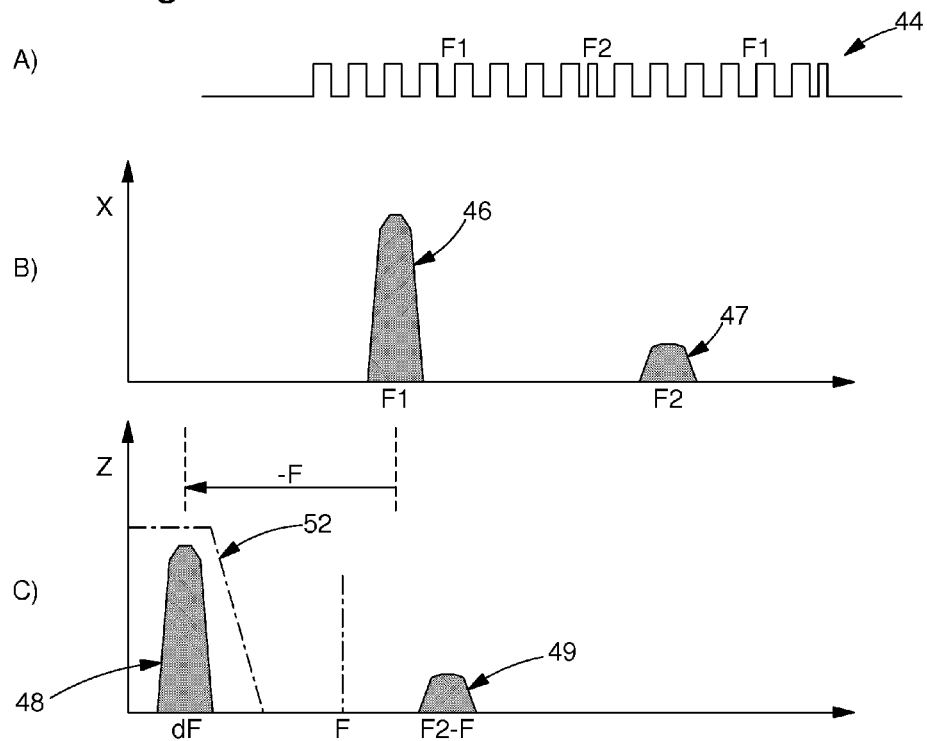
FIG. 3A shows a sequence of bits typically forming the preamble of an interrogation signal that occurs in a system for which the transponder according to the invention is intended.
FIG. 3B is a graph showing the frequency spectrum resulting from the signal of FIG. 3A.
FIG. 3C shows the frequency shift performed by the transponder activation unit according to the invention.

According to the invention, activation unit 30 includes a frequency changer or mixer circuit 32, which receives at its input X an envelope signal supplied by envelope detector 8 of a signal received by antenna 5. Circuit 32 also receives at its input Y a clock signal generated by an internal clock 34. The clock signal frequency F is provided with a value of F equals F1−dF, with F1 being a significant modulation frequency of an interrogation signal or part of such a signal, particularly the preamble thereof, belonging to the RF system for which the transponder is intended. The symbol dF represents a low value frequency defining a low frequency. Thus, clock frequency F is different from but close to modulation frequency F1 belonging to the system concerned. This decreases modulation frequency F1 by a value F, such that the signal frequency supplied at output Z of circuit 32 has the central frequency dF, as shown in FIG. 3.

FIG. 3A shows a bit sequence of the preamble 44 of a conventional interrogation signal in a communications system of the type of the present invention. The signal is frequency modulated and via the majority repetition of the same bit, has a natural significant frequency F1. FIG. 3B shows the frequency spectrum of the signal at input X of the frequency changer or mixer circuit with a peak 46 centred on F1 and a second, small peak 47 centred on frequency F2, which is double frequency F1. FIG. 3C shows the frequency spectrum of output signal Z of circuit 32. As mentioned previously, frequencies F1 and F2 are decreased by a value corresponding to clock signal frequency F. Thus, the frequency spectrum of output signal Z includes a low frequency signal 48, formed by a peak centred approximately on frequency dF, and a small signal 49 at frequency F2–F. Signal Z is then supplied to low frequency amplifying means 36, then to a low pass filter 38, which selectively transmits a relatively narrow frequency band around signal 48, as is shown by curve 52 in the graph of FIG. 3C. The low frequency signal supplied by the frequency changer circuit is thus amplified and filtered by low frequency units 36 and 38.

Finally, the amplified and filtered low frequency signal is supplied to unit 40, arranged for supplying a logic signal 41 that forms a wake up or activation signal for input amplifier 26 and also for modulation circuit 28.

Unit 40 is arranged such that only a signal that has significant amplitude, i.e. generally higher than a certain given value, generates a wake up signal. This situation occurs when the active transponder receives as input, i.e. at its antenna 5, an interrogation signal from a reader with a significant modulation frequency F1. The frequency of low frequency signal 48 supplied at the output of circuit 32 is thus approximately equal to the difference dF between the modulation frequency F1 of the interrogation signal and clock signal frequency F (dF=F1–F).

In a preferred variant, in order to remove a maximum number of potential interference signals, low pass filter 38 and/or amplifying means 36 are provided with a narrow bandwidth, so that only signals modulated approximately at the modulation frequency F1 are amplified and can generate wake up signal 41.

Figure 1:
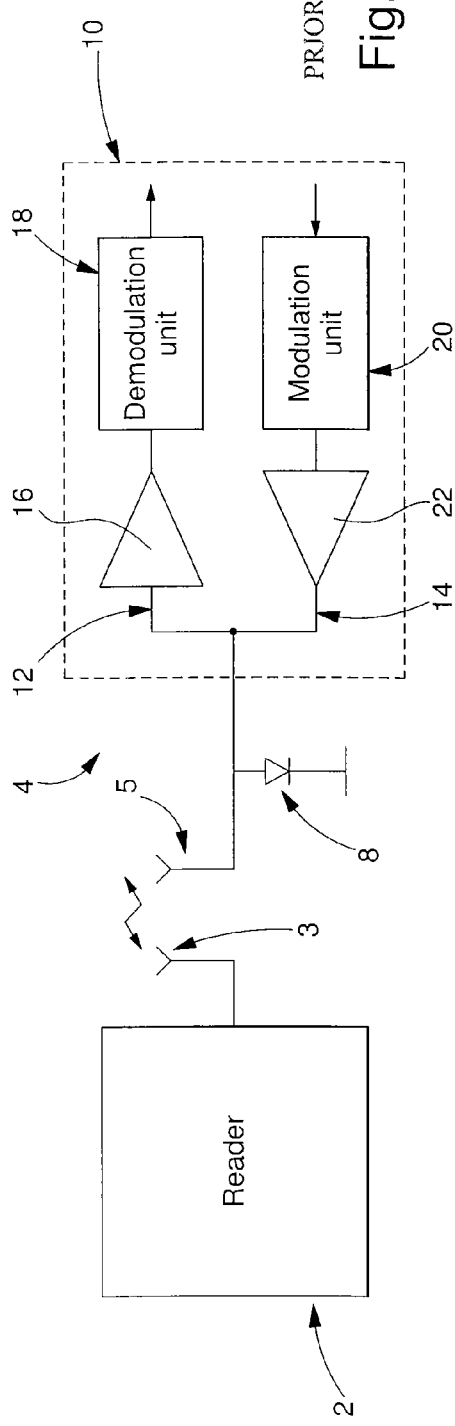
FIG. 1, already described, shows schematically a communication system between a reader and a transponder of the prior art.
Figure 4:
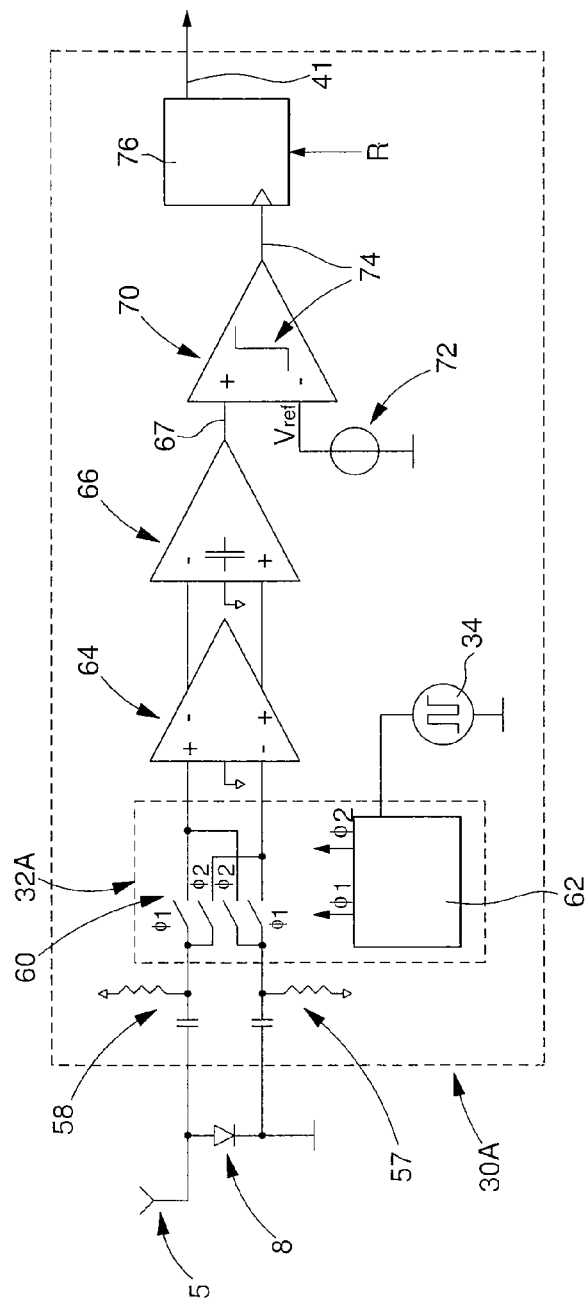
FIG. 4 shows a preferred variant of the electronic circuit forming the transponder activation unit according to the embodiment of FIG. 2.

A preferred arrangement variant of activation unit 30A is shown in FIG. 4. This variant is characterized by a very low electric power consumption (ultra low power) resulting, in particular, from the implementation of a passive frequency changer circuit 32A.

The input part of activation unit 30A includes AC coupling means 57 and 58 for removing any DC component from the envelope signal supplied by envelope detector 8. The resulting AC signal is then supplied to frequency changer circuit 32A, which is formed solely of switches 60 (in this case, four switches controlled in pairs by logic signals φ1 and φ2). These logic signals are supplied by a non-overlapping clock-phase generator 62. Circuit 32A is passive and consumes very little power to operate. When signal φ1 is in a high logic state ("1"), the envelope signal passes straight to a first amplifier 64. When logic signal φ2 is in its high state ("1"), the envelope signal is inverted to be supplied to the first amplifier 64. The signal then passes through a second amplification stage 66, which amplifies the signal and removes any DC part present, if necessary, in the signal exiting first amplifier 64. Signal 67 exiting amplification means 64 and 66 is supplied to a first input of a comparator 70, whose second input is connected to a voltage source 72 that supplies a reference voltage Vref. This comparator 70 generates a logic detection signal 74 when the amplitude of signal 67 is higher than the reference value defined by reference voltage Vref.

Since the detection signal supplied at the output of comparator 70 can be of relatively short duration, a flip-flop 76 is provided. This flip-flop thus maintains a high logic signal, i.e. a wake up signal 41 that is active until reception of a reset signal R. It will be noted that the two amplification stages 64 and 66 form low frequency amplifying means and also a low frequency filter. Comparator 70 is located downstream of the two amplifying stages 64 and 66. It will also be noted that the logic signal generator 62 is connected to internal clock 34, which is used to form the two signals φ1 and φ2.

Wake up signal 41 is applied simultaneously to input amplifier 26 and to demodulation circuit 28 of FIG. 2. Electric power consumption is thus minimised as much as possible in standby mode and the activation circuit of input branch 12 is highly frequency selective.

In sum, then, an active transponder, in accordance with the present invention, includes an input amplifier (26) arranged between an envelope detector (8) and a demodulation circuit (28), and it further includes an activation unit (30) for the input amplifier and also for the demodulation circuit, which is formed by a frequency changer or mixer circuit (32), which decreases a significant modulation frequency of the modulated signal received by the antenna to a low frequency, and the resulting low frequency signal then is amplified and filtered by low frequency elements. The activation unit thus consumes little electric power and sends a wake up signal to the elements operating at a high frequency when it detects the significant modulation frequency, in a very selective manner.

What is claimed is:

1. An active transponder including:
   (a) a logic circuit;
   (b) an RF input-output circuit operably connected to the logic circuit, wherein the RF input-output circuit comprises an input amplifier arranged between an envelope detector for a signal received by an antenna of the transponder and a demodulation circuit for the signal received by the antenna; and
   (c) an activation unit operably connected to the input amplifier, wherein the activation unit comprises
      i. a frequency changer or mixer circuit that, receives as input an envelope signal of the signal received by the antenna and a clock signal generated by an internal clock at a clock frequency that is different from, but close to, a modulation frequency of an interrogation signal of an RF system from which the transponder receives input, wherein the activation unit supplies as output, when the activation unit receives the interrogation signal as input, a low frequency signal, and the value of the low frequency signal is approximately equal to a difference between the modulation frequency and the clock frequency,
      ii. a low pass filter,
      iii. low frequency amplifying means for amplifying the low frequency signal,
      iv. a comparator comprising a first input and a second input and an output, wherein the first input receives a first signal from an ensemble formed by the low frequency amplifying means and the low pass filter, and the second input is connected to a reference voltage, and
      v. a flip-flop element arranged at the output of the comparator, and
      wherein the activation unit supplies a wake up signal to the input amplifier when a signal outputted by the low frequency amplifying means and the low pass filter has an amplitude that is higher than a certain value.

2. The active transponder according to claim 1, wherein said low pass filter and said low frequency amplifying means are provided with a narrow bandwidth so only signals modulated approximately at said modulation frequency are amplified and generate a wake up signal.

3. The active transponder according to claim 1, wherein an input part of said activation unit includes AC coupling means for removing any DC component from said envelope signal.

4. The active transponder according to claim 1, wherein said frequency changer or mixer circuit is a passive circuit comprising switches controlled by a pulse generator connected to said internal clock.

5. The active transponder according to claim 1, wherein said wake up signal is also supplied to said demodulation circuit so as to activate said demodulation circuit simultaneously with said input amplifier.

6. An active transponder including:
(a) a logic circuit;
(b) an RF input-output circuit operably connected to the logic circuit, wherein the RF input-output circuit comprises an input amplifier arranged between an envelope detector for a signal received by an antenna of the transponder and a demodulation circuit for the signal received by the antenna; and
(c) an activation unit operably connected to the input amplifier, wherein the activation unit comprises
  i. a frequency changer or mixer circuit that receives as input an envelope signal of the signal received by the antenna and a clock signal generated by an internal clock at a clock frequency that is different from, but close to, a modulation frequency of an interrogation signal of an RF system from which the transponder receives input, wherein the activation unit supplies as output, when the activation unit receives the interrogation signal as input, a low frequency signal, and the value of the low frequency signal is approximately equal to a difference between the modulation frequency and the clock frequency,
  ii. a low pass filter,
  iii. low frequency amplifying means for amplifying the low frequency signal, and
  iv. a comparator comprising a first input and a second input and an output, wherein the first input receives a first signal from an ensemble formed by the low frequency amplifying means and the low pass filter, and the second input is connected to a reference voltage,
wherein the activation unit supplies a wake up signal to the input amplifier when a signal outputted by the low frequency amplifying means and the low pass filter has an amplitude that is higher than a certain value, and
wherein the frequency changer or mixer circuit is a passive circuit comprising switches controlled by a pulse generator connected to the internal clock.

* * * * *